(12) United States Patent
Weiss et al.

(10) Patent No.: US 12,227,444 B2
(45) Date of Patent: Feb. 18, 2025

(54) COLOURED TRANSPARENT LITHIUM ALUMINIUM SILICATE GLASS-CERAMIC AND USE THEREOF

(71) Applicant: SCHOTT AG, Mainz (DE)

(72) Inventors: Evelin Weiss, Mainz (DE); Martin Spier, Horrweiler (DE); Matthias Bockmeyer, Mainz (DE); Thomas Zenker, Nieder-Olm (DE); Klaus Schönberger, Mainz (DE); Johannes Stinner, Mainz (DE); Oliver Hochrein, Mainz (DE); Uwe Martens, Mainz-Kastel (DE); Michael Bug, Mühltal (DE)

(73) Assignee: SCHOTT AG, Mainz (DE)

( * ) Notice: Subject to any disclaimer, the term of this patent is extended or adjusted under 35 U.S.C. 154(b) by 1154 days.

(21) Appl. No.: 16/105,997

(22) Filed: Aug. 21, 2018

(65) Prior Publication Data

US 2019/0062201 A1   Feb. 28, 2019

(30) Foreign Application Priority Data

Aug. 30, 2017   (DE) .................. 10 2017 119 914.4
Jan. 23, 2018   (DE) .................. 10 2018 101 423.6

(51) Int. Cl.
| | | |
|---|---|---|
| *C03C 10/00* | (2006.01) | |
| *C03C 3/087* | (2006.01) | |
| *C03C 3/097* | (2006.01) | |
| *C03C 4/02* | (2006.01) | |
| *F24C 15/10* | (2006.01) | |

(52) U.S. Cl.
CPC .......... *C03C 10/0027* (2013.01); *C03C 3/087* (2013.01); *C03C 3/097* (2013.01); *C03C 4/02* (2013.01); *C03C 10/0054* (2013.01); *F24C 15/10* (2013.01); *C03C 2204/00* (2013.01)

(58) Field of Classification Search
CPC ... C03C 10/0027; C03C 4/02; C03C 2204/00; F24C 15/10
See application file for complete search history.

(56) References Cited

U.S. PATENT DOCUMENTS

| | | | |
|---|---|---|---|
| 2011/0146657 A1* | 6/2011 | Briedis | ............... F24C 15/2042 |
| | | | 126/39 E |
| 2011/0226231 A1 | 9/2011 | Siebers et al. | |
| 2012/0067865 A1* | 3/2012 | Siebers | ................. F24C 15/10 |
| | | | 219/445.1 |
| 2012/0085336 A1 | 4/2012 | Brunet et al. | |
| 2013/0098903 A1 | 4/2013 | Di Giovanni et al. | |
| 2013/0164509 A1 | 6/2013 | Siebers et al. | |
| 2014/0238971 A1 | 8/2014 | Comte et al. | |
| 2015/0109760 A1 | 4/2015 | Gabel et al. | |
| 2015/0111717 A1 | 4/2015 | Gabel et al. | |
| 2016/0009591 A1 | 1/2016 | Plevacova et al. | |
| 2016/0176752 A1 | 6/2016 | Gabel et al. | |

FOREIGN PATENT DOCUMENTS

| | | |
|---|---|---|
| CN | 100493691 C | 6/2009 |
| CN | 103003210 A | 3/2013 |
| CN | 105209400 A | 12/2015 |
| CN | 105712632 A | 6/2016 |
| CN | 106186707 A | 12/2016 |
| DE | 102008001708 B3 | 6/2009 |
| DE | 102008050263 A1 | 4/2010 |
| DE | 102009013127 A1 | 9/2010 |
| DE | 102010032113 A1 | 1/2012 |
| DE | 102012105576 A1 | 1/2014 |
| DE | 102012105572 A1 | 4/2014 |
| DE | 102014226986 A1 | 6/2016 |
| EP | 1074520 A1 | 2/2001 |
| EP | 1465460 A2 | 10/2004 |
| EP | 3040318 A1 | 7/2016 |
| FR | 3002532 A1 | 8/2014 |
| JP | 2012-520226 A | 9/2012 |
| JP | 2012-528064 A | 11/2012 |
| JP | 2013-531776 A | 8/2013 |
| JP | 2013-532622 A | 8/2013 |
| JP | 2015-528782 A | 10/2015 |
| JP | 2016-509987 A | 4/2016 |
| JP | 2016-155742 A | 9/2016 |
| WO | 2010137000 A2 | 12/2010 |
| WO | 2012001300 A1 | 1/2012 |
| WO | 2010136731 A2 | 12/2012 |

* cited by examiner

*Primary Examiner* — Laura A Auer

(57) ABSTRACT

A description is given of a coloured, transparent, lithium aluminium silicate glass-ceramic and also of the use thereof, said glass-ceramic possessing a light transmission Y of 2.5% to 10% and a spectral transmission $\tau_{(at\ 465\ nm)}$ of more than 1.0%.

14 Claims, No Drawings

COLOURED TRANSPARENT LITHIUM ALUMINIUM SILICATE GLASS-CERAMIC AND USE THEREOF

This application claims priority of German patent application DE 10 2017 119 914.4 filed Aug. 30, 2017 and DE 10 2018 101 423.6 filed Jan. 23, 2018, the entire contents of which are hereby incorporated by reference.

TECHNICAL FIELD OF THE INVENTION

The present invention relates to a coloured, transparent lithium aluminium silicate glass-ceramic. The invention also relates to the use of such a LAS glass-ceramic.

BACKGROUND OF THE INVENTION

Field of the Invention

It is known that glasses comprising the $Li_2O$—$Al_2O_3$—$SiO_2$ system can be converted into glass-ceramics having high-quartz mixed crystals and/or keatite mixed crystals as main crystal phases. For the first type of glass-ceramics, the synonyms "β-quartz" or "β-eucryptite", and, for the second type, "β-spodumene", are found in the literature as designations for the crystal phases. A preferred field of application for LAS glass-ceramics is their use as cooking surfaces.

A key property of these glass-ceramics is that within a temperature range from room temperature to about 700° C. they have an extremely low coefficient of thermal expansion $\alpha_{20/700}$ of customarily below $1.5 \cdot 10^{-6}$/K. Glass-ceramics having high-quartz mixed crystals as main crystal phase possess lower coefficients of expansion in the range of their service temperatures, as cooking surface, for example, of usually around $0 \pm 0.3 \cdot 10^{-6}$/K, whereas the glass-ceramics having keatite mixed crystals as main crystal phase are situated at values of around $0.8 \cdot 10^{-6}$/K to $1.5 \cdot 10^{-6}$/K. The two types of glass-ceramics are also different in their average crystallite sizes. Glass-ceramics having high-quartz mixed crystals can be produced in transparent or transparently coloured forms, owing to their relatively low crystallite size of customarily below 50 nm. If keatite forms the main phase, the average crystallite sizes are customarily above 100 nm, and are translucent to opaque, owing to resulting light scattering. There are, however, also transparent keatite phases, described for example in DE 10 2014 226 986 A1 or FR 3 002 532 A1.

Because of the low thermal expansion at their surface temperatures, LAS glass-ceramics possess excellent temperature difference resistance and temperature change stability and also dimensional constancy.

The industrial production of LAS glass-ceramics is familiar to the skilled person. It involves first melting and refining the crystallizable starting glass from a mixture composed of glass fragments and pulverulent mix raw materials at temperatures customarily between 1550° C. and 1700° C. Refining agents used are usually arsenic oxide and/or antimony oxide or—especially for eco-friendly refining—tin oxide. To improve the bubble quality, a high-temperature refining above 1700° C. can also be employed. After melting down and refining, the glass customarily undergoes hot forming by casting, pressing or by means of rolling or floating in order to produce plates. In a subsequent temperature operation, the starting glass is converted by controlled crystallization into the glass-ceramic article. This ceramization takes place in a two-stage heat treatment process, in which first nucleation takes place at a temperature between 680° C. and 800° C. to generate nuclei, composed customarily of $ZrO_2$/$TiO_2$ mixed crystals. On subsequent increase in temperature, the high-quartz mixed crystals grow on these nuclei at the crystallization temperature of 800° C. to 950° C. At the maximum production temperature, the microstructure of the glass-ceramic is homogenized, at which stage the optical, physical and chemical properties are established. If desired, the high-quartz mixed crystals can subsequently be converted also into keatite mixed crystals. Conversion into keatite mixed crystals takes place on increase in temperature in a temperature range from around 950° C. to 1250° C. The conversion is accompanied by an increase in the coefficient of thermal expansion of the glass-ceramic, and in general further crystal growth results in light scattering, associated with a translucent to opaque appearance. The conversion increases the crystallinity and the glass-ceramics become stronger.

By addition of colour oxides such as $V_2O_5$, CoO, NiO, $Fe_2O_3$, $Cr_2O_3$, $CeO_2$, individually or in combination, the glass ceramics can be coloured, in order to produce, for example, black cooking surfaces with a defined transmission profile.

With coloured glass-ceramics as well, a distinction is made between transparent, translucent and opaque glass-ceramics. The former are frequently referred to as colouredly transparent, in contrast to the uncoloured transparent glass-ceramics, which are called transparent. For the optical quality of coloured transparent glass-ceramics, the transparency and the colour conveyed are critical. Transparency means that the glass-ceramics are to possess relatively high light transmission in the visible range and also low light scattering (clouding). The light transmission measured in the CIE colour system as light transmission Y(D65, 2°), often also referred to as $\tau_{vis}$ or brightness, is therefore on the one hand to be at or above a minimum value, in order to ensure sufficient viewing of the underside-applied displays in the switched-on state, and on the other hand not to exceed a maximum value, in order to leave the interior of the hob invisible in the switched-off state, and hence to allow the realization of a dead front effect, whether in combination with a colour compensation filter or without such a filter. The transparent glass-ceramic is to possess little to no visually disrupting light scattering, so that the view through to articles and illuminating displays is not falsified. The indications of displays beneath the glass-ceramic plate are to be clear, the contours sharp and visible practically without clouding. One way of achieving the low light scattering is via a high density of nuclei, resulting in the high-quartz mixed crystals that grow on having a size below the range of the wavelength of visible light. The average crystallite size of the high-quartz mixed crystals is situated typically in the range from 20 nm to 50 nm. A high density of nuclei requires sufficient amounts of nucleating agents and also sufficient nucleation times during the ceramization.

If the aim is for the best result in terms of high visibility of the underside-mounted displays in conjunction with reduced sight into the hob interior, the requirement is to form as flat as possible a curve profile in the visible transmission range (380 nm-780 nm). The desire in particular is for a well-distributed, neutral light-transmissibility for spectral wavelengths between 450 nm and 700 nm. To the extent that displays in hobs in colours other than red are increasing in importance, a very wide variety of different transmission profiles have been outlined in the prior art, but they all suffer from one disadvantage or another and/or are realized in a disadvantageous way.

Description of the Related Art

DE 10 2008 050 263 A1 describes transparent, coloured glass-ceramic cooking surfaces having a spectral transmission of >0.1% in the visible light range for wavelengths>450 nm, but having at maximum a light transmission in the visible range of 2.5%.

DE 10 2009 013 127 A1 describes transparent, coloured glass-ceramic cooking surfaces having a light transmission in the visible range of up to 5% and having a spectral transmission of >0.1% in the visible light range for wavelengths>450 nm, but does not lead to products conveying a neutral colour.

DE 10 2012 105 576 A1 and DE 10 2012 105 572 A1 describe glass-ceramic plates having $\tau_{vis}$>2.5% and having greatly varying values at the wavelengths in the range from 420 to 480 nm that are so important for the colour conveyed.

WO 2012/001300 A1 describes glass or glass-ceramic cooking surfaces having a $\tau_{vis}$ of at least 2.3% up to very bright 40% and transmissions in the 420 nm-480 nm range of at least 0.6%, in combination with a covering means, but does not lead to products conveying a neutral colour.

EP 1 465 460 A1 describes a cooking surface which with a thickness of 3 mm has Y(D65) values of 2.5%-15%. Its working examples are As-containing.

WO 2010/137000 A1 describes glass-ceramics which at a thickness of 3 mm possess a light transmission of 1.5 to 5% and a spectral transmission of >0.5% at between 450 and 480 nm. These transmissions are realized by means of cobalt oxide.

WO 2010/136731 A1 as well is concerned with the display capacity of cooking surfaces, and claims glass-ceramics which with a thickness of 4 mm possess a spectral transmission of between 0.2 and 4% anywhere in the range between 400 and 500 nm.

SUMMARY OF THE INVENTION

Economic production of the glass-ceramics is subject to the desire for a low melting temperature and a low processing temperature VA of the initial glasses. During forming, moreover, the glass must not exhibit any devitrification, meaning that there should be no formation of destructive crystals which adversely affect the strength in the starting glasses and glass-ceramics produced from them.

It is an object of the invention to provide coloured, transparent, lithium aluminium silicate glass-ceramics which ensure effective visibility of the underside-mounted displays in conjunction with reduced sight into the hob interior, and a minimal shift in colour of the display colours through the cooking surface, in other words an as far as possible unfalsified visibility of the display colours red, green, blue and hence also white and other colours.

It is also an object of the invention to disclose uses for the articles produced from the LAS glass-ceramics.

The glass-ceramics disclosed herein satisfy the requirements of the various applications in terms, for example, of chemical resistance, mechanical strength, transmission, temperature robustness and long-term stability with regard to changes in their properties (such as, for example, thermal expansion, transmission, development of stresses).

And they possess economic and eco-friendly manufacturing qualities.

These objects are achieved by a coloured transparent lithium aluminium silicate glass-ceramic according to claim 1 and by the use thereof according to claim 11.

The stated diverse requirements are fulfilled by the eco-friendly, coloured transparent lithium aluminium silicate glass-ceramic of the invention, which as well as the customary properties required of a glass-ceramic suitable as a coating surface, has particular transmission properties and has been produced without certain environmentally harmful constituents.

Hence the glass-ceramic of the invention possesses a light transmission measured in the CIE system as light transmission Y(D65, 2°) of at least 2.5%, preferably more than 2.5%, more preferably at least 3.5% and very preferably at least 4.5%, and of at most 10%, preferably at most 7.5% and more preferably 5%. The values are as measured with standard illuminant D65, observer angle 2° for a polished glass-ceramic sample 4 mm thick.

The glass-ceramic of the invention possesses a spectral transmission $\tau$ at 465 nm of more than 1.0%, preferably of more than 1.2%. The values are measured on a polished, ceramized glass-ceramic sample 4 mm thick.

Furthermore, in the glass-ceramic of the invention, these two transmission properties have a certain ratio to one another. Hence in accordance with the invention the difference $(Y(D65, 2°) - \tau_{(at\ 465\ nm)})$ is not more 3%, preferably less than 3%.

The glass-ceramic of the invention having these properties is a lithium aluminium silicate glass-ceramic having a $V_2O_5$ content of 55 ppm to 200 ppm, and an $Fe_2O_3$ content of 450 ppm to 1000 ppm, with a ratio of $Fe_2O_3/V_2O_5$ (both in wt % or ppm) of 3 to 9, preferably of 5 to 7. The $V_2O_5$ content is preferably at least 100 ppm, and preferably is at most 200 ppm. The $Fe_2O_3$ content is preferably at least 700 ppm. The ppm unit as well relates to parts by weight.

The glass-ceramic of the invention is free from cobalt oxide, nickel oxide and from chromium oxide. "Free from" the stated components means that cobalt oxide is present, if at all, at not more than 10 ppm (indicated as CoO); that nickel oxide is present, if at all, at not more than 20 ppm (indicated as NiO); and that chromium oxide is present, if at all, at not more than 20 ppm (indicated as $Cr_2O_3$).

Accordingly, the glass-ceramic of the invention unites a light transmission which on the one hand allows effective visibility of the underside-mounted displays with, on the other hand, reduced sight into the hob interior, with a colour transmissibility which is such that not only red but also other colours such as green are transmitted, together with a very neutral, in other words unfalsified, conveying of colour and brightness, in other words a conveying of light that is unchanged or barely changed despite passage through the glass-ceramic plate.

The LAS glass-ceramic of the invention preferably has a transmission in the red spectral range, i.e. in the 610 nm to 650 nm range, which is increased relative to the transmission of the materials customarily used for deployment with red displays. This is advantageous because, to the extent that LED displays are being equipped with an ever greater number of LEDs, the specific power supply per LED is decreasing for a given connection power.

Preferably, therefore, the glass-ceramic of the invention possesses a spectral transmission $\tau$ at 630 nm of 10.9%±3.8%, more preferably of 10.9%±2.5%, very preferably of 10.9%±2.0%, especially preferably 10.9%±1.5%. These values are measured on a polished, ceramized glass-ceramic sample 4 mm thick. 10.9%±3.8% should be understood as the range from 7.1° A to 14.7%.

The LAS glass-ceramic of the invention possesses an eco-friendly composition. This means that as well as its freedom from the colouring oxides cobalt oxide, nickel oxide and chromium oxide, the glass-ceramic is also technically free, barring unavoidable raw material impurities, from the refining agents arsenic oxide and antimony oxide. As impurities, the arsenic oxide and antimony oxide components (indicated as $As_2O_3$ and $Sb_2O_3$, respectively) are present in amounts of in total less than 1000 ppm, preferably less than 400 ppm.

The oxides $Li_2O$, $Al_2O_3$ and $SiO_2$ in an LAS glass-ceramic are necessary constituents of the mixed crystals.

To this end, the $Li_2O$ content is preferably at least 3.0 wt %. It is preferably at most 4.2 wt %, since higher contents may possibly lead to devitrification in the production process. An $Li_2O$ content of at least 3.2 wt % is preferred; and $Li_2O$ content of at most 4.0 wt % is preferred.

In order to avoid high viscosities on the part of the initial glass and to suppress the devitrification tendency during forming, the $Al_2O_3$ content is preferably at most 23 wt %. It is preferably at least 19 wt %. An $Al_2O_3$ content of at least 20 wt % is preferred; and $Al_2O_3$ content of at most 22 wt % is preferred.

The $SiO_2$ content is preferably at most 69 wt %, since $SiO_2$ greatly increases the viscosity of the glass, and higher contents would lead to uneconomic melting and forming conditions. The content is preferably at least 60 wt %. An $SiO_2$ content of at least 62 wt % is preferred; an $SiO_2$ content of at most 67 wt % is preferred.

As optional components, MgO, ZnO and $P_2O_5$ may be present and in that case may be incorporated into the high-quartz mixed crystals.

If ZnO is present, the ZnO content is preferably limited to at most 2.2 wt %, since otherwise there is a risk of formation of unwanted crystal phases such as gahnite. A ZnO content of at least 1 wt % is preferred.

If MgO is present, the MgO content is preferably limited to at most 1.5 wt %, since otherwise there is too great an increase in the coefficient of thermal expansion of the glass-ceramic. An MgO content of at least 0.1 wt % is preferred; an MgO content of at most 1.3 wt % is preferred.

If $P_2O_5$ is present, the $P_2O_5$ content is preferably limited to at most 3 wt %, since otherwise there may be a drop in the acid resistance. A $P_2O_5$ content of at most 0.1 wt % is preferred. With preference, $P_2O_5$ is omitted, barring possible impurities.

The glass-ceramic preferably comprises $Na_2O$ and/or $K_2O$ at in total at least 0.2 wt %. The glass-ceramic preferably comprises $Na_2O$ and/or $K_2O$ at in total at most 1.5 wt %.

The glass-ceramic may also comprise alkali earth metal oxides, and specifically SrO and/or CaO, limited preferably to a total of at most 4 wt %, and/or BaO, preferably limited to not more than 3 wt %.

The stated alkali metal oxides and the stated alkaline earth metal oxides support the formation of a glassy surface layer, enriched in these components and depleted in $Li_2O$, in the glass-ceramic. It is beneficial to the chemical resistance of the glass-ceramic.

The glass-ceramic may also comprise $B_2O_3$, specifically limited preferably to not more than 2 wt %.

$B_2O_3$, the stated alkali metal oxides and the stated alkaline earth metal oxides improve the meltability and the devitrification stability during the forming of the green glass. At levels higher than those stated, the thermal expansion may be increased and there may be a detrimental effect on the crystallization behaviour during the conversion of the green glass into the glass-ceramic.

The $B_2O_3$ content is preferably at most 1 wt %, and with particular preference no $B_2O_3$ is included, barring possible impurities.

A BaO content of at least 1.0 wt % is preferred; a BaO content of at most 2.8 wt % is preferred.

The amount in total of SrO and/or CaO is preferably at least 0.2 wt %; the amount in total of SrO and/or CaO is preferably at most 1 wt %.

The amount in total of $Na_2O$ and/or $K_2O$ is preferably at least 0.4 wt %; the amount in total of $Na_2O$ and/or $K_2O$ is preferably at most 1.2 wt %.

The glass-ceramic preferably comprises $TiO_2$ with a minimum content of 2.5 wt %.

The glass-ceramic preferably comprises $ZrO_2$ with a minimum content of 0.5 wt %.

The glass-ceramic preferably comprises $SnO_2$ with a minimum content of 0.05 wt %.

These three components serve as nucleating agents.

The glass-ceramic preferably comprises at most 4 wt % of $TiO_2$, since higher levels may impair the devitrification stability.

The glass-ceramic preferably comprises at most 2 wt % of $ZrO_2$, because larger amounts may impair the melt-down behaviour of the mix during glass production and may be detrimental to the devitrification stability during forming, as a result of formation of $ZrO_2$-containing crystals.

The glass-ceramic comprises less than 0.6 wt % of $SnO_2$, since larger amounts may detract from the devitrification stability.

A $TiO_2$ content of at least 2.8 wt % is preferred; a $TiO_2$ content of at most 3.5 wt % is preferred.

A $ZrO_2$ content of at least 1 wt % is preferred; a $ZrO_2$ content of at most 1.8 wt % is preferred.

A $SnO_2$ content of at least 0.1 wt % is preferred; a $SnO_2$ content of at most 0.4 wt % is preferred, more preferably of at most 0.3 wt %.

It is particularly preferred for the sum total of $TiO_2$, $ZrO_2$ and $SnO_2$ not to exceed 5.5 wt %.

These and other aspects and objects, features and advantages of the present invention will become apparent upon a consideration of the following detailed description.

It is to be understood that both the foregoing general description and the following detailed description are merely exemplary of the invention, and are intended to provide an overview or framework for understanding the nature and character of the invention as claimed.

DETAILED DESCRIPTION OF PREFERRED EMBODIMENTS

According to one preferred embodiment, the coloured, transparent LAS glass-ceramic comprises as main constituents the following components (in wt % on an oxide basis):

| | |
|---|---|
| $Li_2O$ | 3.0-4.2 |
| $Na_2O + K_2O$ | 0.2-1.5 |
| MgO | 0-1.5 |
| CaO + SrO | 0-4 |
| BaO | 0-3 |
| ZnO | 0-2.2 |
| $Al_2O_3$ | 19-23 |
| $SiO_2$ | 60-69 |
| $TiO_2$ | 2.5-4 |
| $ZrO_2$ | 0.5-2 |
| $SnO_2$ | 0.05-<0.6 |
| $P_2O_5$ | 0-3 |
| $B_2O_3$ | 0-2 |

And also the stated amounts of $V_2O_5$ of 55 ppm to 200 ppm and of $Fe_2O_3$ of 450 ppm to 1000 ppm with a ratio of $Fe_2O_3/V_2O_5$ (both in wt %) of 3 to 9 and also, optionally, additions of chemical refining agents such as $CeO_2$ and refining additives such as sulfate compounds, chloride compounds, fluoride compounds in total amounts of up to 2.0 wt %.

The glass-ceramic preferably consists substantially of the stated components in the stated portions. By "consists substantially of . . ." is meant that these components are included at not less than 98 wt % in the glass-ceramic.

The water content of the crystallizable glasses for producing the glass-ceramics is preferably between 0.015 and 0.06 mol/l, depending on the choice of the mix raw materials and on the operating conditions at melting. This corresponds to p-OH values of 0.16 to 0.64 $mm^{-1}$. On conversion into the glass-ceramic, there is a change in the IR band, which is used for determining the water content. As a result, owing to the measurement process, the β-OH value for the glass-ceramic increases by a factor of around 1.6, without any accompanying change in the water content. This and the method for determining the β-OH values are described for example in EP 1 074 520 A1.

According to a further preferred embodiment, the coloured, transparent LAS glass-ceramic comprises as main constituents the following components (in wt % on an oxide basis):

| | |
|---|---|
| $Li_2O$ | 3.2-4.0 |
| $Na_2O + K_2O$ | 0.4-1.2 |
| MgO | 0.1-1.3 |
| CaO + SrO | 0.2-1 |
| BaO | 1.5-2.8 |
| ZnO | 1-2.2 |
| $Al_2O_3$ | 20-22 |
| $SiO_2$ | 62-67 |
| $TiO_2$ | 2.8-3.5 |
| $ZrO_2$ | 1-1.8 |
| $SnO_2$ | 0.1-0.4 |
| $P_2O_5$ | 0-0.1 |
| $B_2O_3$ | 0-1 | and also, optionally, refining additives such as sulfate, chloride, fluoride compounds in total amounts of up to 1.0 wt %.

The glass-ceramic preferably consists substantially of the stated components in the stated portions. By "consists substantially of . . ." is meant that these components are included at not less than 98 wt % in the glass-ceramic.

If $SnO_2$ is present as a nucleating agent, the glass-ceramic may also be refined by means of $SnO_2$. For that purpose the compound is present in the proportions discussed above. Its refining effect may be supported by the above-stated defining additives.

In order to achieve a very good refining effect in conjunction with the required bubble qualities and tank throughputs, it may be advantageous to carry out high-temperature refining at above 1700° C., preferably above 1750° C. In that case a bubble quality of less than 2 bubbles/kg in the glass or in the glass-ceramic (measured for bubble sizes of greater than 0.1 mm in one dimension) is achieved.

A large number of compounds of elements such as, for example, the alkali metals Rb and Cs or elements such as Mn and Hf are customary impurities in the mix raw materials that are used industrially. Other compounds, such as those of the elements W, Nb, Y, Mo, Bi and the raw earths, for example, may likewise be included in small proportions.

The coloured, transparent, lithium aluminium silicate glass-ceramic customarily comprises high-quartz mixed crystals as the main crystal phase. The average crystallite size is preferably less than 50 nm.

The LAS glass-ceramic of the invention preferably exhibits light scattering, reported as the integral haze value for standard illuminant C, determined according to ASTM D1003-13, of less than 20%, preferably less than 15%, for 3.5 mm.

The thermal expansion, measured between 20° C. and 700° C., for this type of LAS glass-ceramic with high-quartz mixed crystals, is established preferably at values of less than $1 \cdot 10^{-6}$/K, preferably of $(0 \pm 0.3) \cdot 10^{-6}$/K.

The lithium aluminium silicate glass-ceramic with high-quartz mixed crystals as the main crystal phase may be converted, in a customary way known to the skilled person, into a glass-ceramic having keatite mixed crystals as the main crystal phase. Owing to the customarily larger average crystallite size of greater than 120 nm, this converted glass-ceramic is translucent or opaque. The glass-ceramic with high-quartz mixed crystals as the main crystal phase may also be converted into a glass-ceramic with keatite mixed crystals as the main crystal phase in such a way that its crystallites remain sufficiently small, so that the glass-ceramic is transparent. A glass-ceramic of this kind with keatite mixed crystals customarily has a thermal expansion, measured between 20° C. and 700° C., of $0.8 \cdot 10^{-6}$/K to $1.5 \cdot 10^{-6}$/K, preferably of more than $1 \cdot 10^{-6}$/K to $1.5 \cdot 10^{-6}$/K.

The preferred geometry for the glass-ceramic of the invention or for the articles produced from it is in the form of plates. The plate preferably has a thickness of 2 mm to 20 mm, because this opens up important applications. At lower thicknesses, the strength is impaired; higher thicknesses are less economic because of the higher consumption of material. Except for service as safety glass, where high strengths are an important factor, therefore, the thickness selected is generally below 6 mm. In the case of service as a cooking surface, preferred thicknesses selected are from 2 mm to 6 mm. For the customary, standard cooking surfaces, sizes of up to 0.5 $m^2$ are customarily preferred. For larger implementations, with colour displays for example or if the cooking surface is configured at the same time as a work surface and includes further functionalities as well as the cooking function, these functionalities being set out in more detail when the possible applications as a cooking surface are outlined, preference is given to formats of greater than 0.5 $m^2$ or even of greater than 0.8 $m^2$.

Suitable shaping processes for the plate-like geometry are, in particular, rolling and floating.

The glass-ceramic plate and the articles preferably produced from it may not only be flat in their shaping, but may also have been three-dimensionally moulded. For example, chamfered, angled or arched plates may be used. The plates may be right-angled or have other shapes, and, in addition to flat regions, they may include three-dimensionally moulded regions, e.g. woks, or rolled-in webs or areas as elevations or depressions, respectively. The geometric moulding of the plates is undertaken at the hot forming stage, by means of structured shaping rollers, for example, or by subsequent hot forming on the initial glasses, by means of burners or by dropping under gravity, for example. Ceramization is operated with supporting ceramic moulds in order to avoid uncontrolled changes in the geometric shape.

The glass-ceramic plate and the articles preferably produced from it may be smooth on both sides or may be pimpled on one side.

As a result of the favourable optical and thermal properties associated with the low thermal expansion and the optimized transition profile, and also by virtue of the other properties, especially the mechanical properties, there are numerous applications that are catered for advantageously.

The coloured, transparent glass-ceramic articles of the invention find application in the form of a cooking surface, more particularly a cooking surface with underside coating, or of an underside-coated cooking surface with cut-outs, so-called spare-outs for lighting in the cold region, i.e. in the display/indication region, and/or in the hot region, in other words in the cooking region, with cover means, or of a cooking surface having a so-called diffuser layer, which evenly distributes the light emerging from the underside of the cooking surface towards the viewer, or of a cooking surface having a so-called colour compensation filter, applied in adhered or printed or coated form. Additionally, it may take the form of a cooking surface in one of the above-stated versions with opaque or transparent capacitive sensor structures, applied in bonded, printed or pressed-on form, for regulating and controlling operation. Additionally, it may take the form of a cooking surface in one of the above-stated implementations, with one or more holes for control buttons, gas burners, fume removal systems (so-called down-draft systems) or other functional modules, optionally implemented with a flat facet on one or more edges.

Furthermore, it may take the form of a cooking surface in one of the above-stated versions, having transmission, defined via the Y(D65, 2°) value, that is increased/modified locally in the display region and/or hot region. This transmission) Y(D65, 2° may be increased locally up to 50%, preferably up to 30%, more preferably up to 25%, relative to the base transmission or nominal transmission of the substrate.

In one especially preferred embodiment, the transmission is increased locally up to 5%, more preferably up to 2.5%, relative to the base transmission.

In one embodiment of the invention, the transmission may also be lowered locally by 4%, preferably by 3%, relative to the base transmission of the substrate.

This lowering of the base transmission may be accomplished by coating or by a film or by intrinsic local modification to the material.

In particular embodiments, the glass-ceramics may find application for cookers equipped with sensors for measuring the pan temperature. Sensors of this kind may be fitted, for example, directly in the pan or above the pan, or may detect the temperature of the pan base by means of IR sensors.

Such IR sensors operate preferably at a wavelength>1 μm, preferably ≥1500 nm. In one particular embodiment, such sensors operate at a wavelength of 3-5 μm. The cooking surface therefore has a corresponding transmission in the relevant wavelength range. Ways in which this is ensured include either a local cut-out in the cover means or sufficient transparency of the cover means in the relevant wavelength range.

In other particular embodiments, the glass-ceramics may find application for cookers equipped with a wireless data connection. This data connection may serve to integrate the cooker with a fume hood, with a central control unit for household appliances, or else for functional control of the cooker. Data connections may be made via IR sensors or from radio links in the GHz range, e.g. wifi, Bluetooth.

Preferably, such IR sensors operate at a wavelength of 0.9-1 μm, preferably 930-970 nm. The cooking surface therefore has a corresponding transmission in the relevant wavelength range. Ways in which this is ensured include either a local cut-out in the cover means or sufficient transparency of the cover means in the relevant wavelength range.

In further particular embodiments, the glass-ceramics may find application for cookers equipped with a contactless control technology. Such controls operate, for example, by means of capacitive sensor technology, IR sensors or else ultrasound sensors.

In further particular embodiments, the glass-ceramics may find application for cookers equipped with LED-based and/or segment-based display elements and/or graphic display elements. These graphic display elements may have a single colour or multiple colours. Preferred single-colour graphic displays are white. Display elements of this kind are preferably designed with a capacitive touch-sensor system.

In further particular embodiments, the glass-ceramics may find application for cookers equipped with a minimum of top face decoration. In one embodiment, there are only one or more brand logos and the on/off switch located on the top face. In this case the decorative function for cooking zone marking, for example, is taken on entirely via lighting elements.

Furthermore, the glass-ceramics are used in conjunction with a functional top-face coating.

These functional top-face coatings may be applied in order to improve the scratch resistance, to facilitate capacity for cleaning, to improve the visibility of displays, to prevent destructive reflections, to minimize fingerprints and/or to minimize noises from pot movement.

In one particular embodiment, the surface may be polished or have a stochastic structure.

Furthermore, the coloured, transparent glass-ceramic articles according to the invention may find use as chimney viewing panel/chimney oven lining or facing, covering in the lighting sector and as safety glass optionally in a laminate system, as support plate or oven lining. In the ceramics, solar or pharmaceutical industry or in medical technology, they are suitable especially for production processes under high-purity conditions, as linings of ovens in which chemical or physical coating processes are carried out, or as chemically resistant laboratory equipment. Furthermore, they find use as a glass-ceramic article for high-temperature or extreme low-temperature applications, as furnace windows for combustion furnaces, as a heat shield for shielding hot environments, as a covering for reflectors, floodlights, projectors, photocopiers, for applications with thermomechanical exposure, as for example in night vision devices, or as cover for heating elements, especially as a cooking or frying surface, as white ware, as heating element covering, as wafer substrate, as article with UV protection, as architectural facing plate or as construction constituent of an electronic device.

The entire disclosures of all applications, patents and publications, cited above and below, and of corresponding German application DE 10 2017 119 914.4 filed Aug. 30, 2017 and DE 10 2018 101 423.6 filed Jan. 23, 2018, are hereby incorporated by reference.

The present invention will be illustrated below by a series of examples. However, the present invention is not limited to the examples mentioned.

The present invention is illustrated further by means of the following examples.

EXAMPLES

In the case of working Example A1 to A6, the starting glasses were melted down from raw materials customary in the glass industry, at temperatures of around 1620° C., for 4 hours. After the mix had been melted down in crucibles made from refractory material with a high quartz content, the melts were poured into PtRh20 crucibles having a crucible liner made of silica glass, and were homogenized by stirring for 60 minutes at temperatures of 1600° C. Following this homogenization, the glasses were refined at 1640° C. for 3 hours. Then pieces with a size of around 170×120×25 mm³ were cast and were cooled in a cooling oven, beginning at 640° C., to room temperature. The castings were divided into the sizes required for the investigations and for the ceramization.

Working Examples A7 to A11 were melted industrially with the parameters customary for Sn refined LAS glass-ceramics.

The samples were ceramized using the ceramization programme outlined later on below.

Table 1, for Examples A1 to A11, which represents working examples, and C1 to C8, which represent comparative examples, shows the compositions and properties of the crystallizable starting glasses and properties of the glass-ceramics produced from the glasses.

Owing to typical impurities in the industrial mix raw materials used, the compositions do not add up to precisely 100.0 wt %. Typical impurities, although not introduced deliberately into the composition, are compounds of Mn, Rb, Cs, Hf or else, if not used as refining agents, of CI and F, which customarily amount to not more than 0.1 wt %. They are often entrained via the raw materials for the related components—for example, Rb and Cs via the Na or K raw materials, or Hf via the Zr raw material.

The transmission measurements were carried out on polished plates with a thickness of 4 mm using standard illuminant C, 2°. The transmission values reported are those at selected wavelengths, namely at 465 nm, at 470 nm and at 630 nm, and also the light transmission. The terms "light transmission" and "brightness Y" correspond to the same measured parameter, measured according to DIN 5033 in the CIE colour system as Y(D65, 2°). Also reported is the difference $\tau_{vis}-\tau_{465}$, i.e. $Y-\tau_{465}$.

The ceramization programme was as follows:
a) Heating from room temperature to 600° C. in 5 min.
b) Temperature increase from 600° C. to a nucleation temperature $T_{nucl}$ of between 700° C. and 750° C. at a heating rate of 50 K/m in, hold time $t_{nucl}$ of 5 min.
b1) Temperature increase to a crystallization temperature $T_{cryst}$ of between 780° C. and 820° C. at a heating rate of 12 K/m in, hold time $t_{cryst}$ of 8 min at $T_{cryst}$.
c) Temperature increase from $T_{cryst}$ to a maximum temperature $T_{max}$ of between 910° C. and 950° C. to a heating rate of 20 K/m in, hold time $t_{max}$ of 7 min at $T_{max}$.
d) Cooling to around 800° C. at 10 K/min, then rapid cooling to room temperature.

TABLE 1

| Wt % | A1 | A2 | A3 | A4 | A5 | A6 | A7 | A8 | A9 |
|---|---|---|---|---|---|---|---|---|---|
| $Al_2O_3$ | 20.5 | 20.5 | 20.5 | 20.5 | 20.5 | 20.5 | 20.6 | 20.57 | 20.63 |
| BaO | 2.31 | 2.31 | 2.3 | 2.29 | 2.3 | 2.3 | 2.31 | 2.3 | 2.3 |
| CaO | 0.420 | 0.42 | 0.42 | 0.42 | 0.42 | 0.42 | 0.41 | 0.41 | 0.41 |
| CoO | — | — | — | — | — | — | — | — | — |
| $Cr_2O_3$ | — | — | — | — | — | — | — | — | — |
| F | — | — | — | — | — | — | — | — | — |
| $Fe_2O_3$ (ppm) | 940 | 940 | 920 | 910 | 810 | 710 | 890 | 887 | 895 |
| $HfO_2$ | 0.025 | 0.025 | 0.025 | 0.025 | 0.025 | 0.025 | 0.024 | 0.024 | 0.024 |
| $K_2O$ | 0.24 | 0.25 | 0.24 | 0.24 | 0.24 | 0.25 | 0.27 | 0.26 | 0.26 |
| $Li_2O$ | 3.91 | 3.91 | 3.89 | 3.92 | 3.91 | 3.95 | 3.8 | 3.8 | 3.79 |
| MgO | 0.32 | 0.31 | 0.31 | 0.32 | 0.32 | 0.31 | 0.3 | 0.3 | 0.3 |
| $MnO_2$ | 0.018 | 0.023 | 0.029 | 0.019 | 0.018 | 0.018 | 0.018 | 0.018 | 0.018 |
| $MoO_3$ | — | — | — | — | — | — | — | — | — |
| $Na_2O$ | 0.6 | 0.61 | 0.6 | 0.59 | 0.6 | 0.59 | 0.62 | 0.62 | 0.62 |
| $Nb_2O_5$ | — | — | — | — | — | — | — | — | — |
| NiO | — | — | — | — | — | — | — | — | — |
| $P_2O_5$ | 0.029 | 0.029 | 0.029 | 0.029 | 0.029 | 0.029 | 0.062 | 0.061 | 0.063 |
| $Sb_2O_3$ | — | — | — | — | — | — | — | — | — |
| $SiO_2$ | 65.1 | 65.1 | 65.1 | 65.2 | 65.2 | 65.2 | 65.14 | 65.2 | 65.15 |
| $SnO_2$ | 0.27 | 0.27 | 0.27 | 0.26 | 0.27 | 0.26 | 0.27 | 0.26 | 0.26 |
| SrO | 0.018 | 0.018 | 0.018 | 0.018 | 0.018 | 0.018 | 0.029 | 0.028 | 0.028 |
| $TiO_2$ | 3.19 | 3.18 | 3.2 | 3.17 | 3.17 | 3.18 | 3.11 | 3.11 | 3.09 |
| $V_2O_5$ (ppm) | 170 | 150 | 140 | 190 | 180 | 180 | 140 | 131 | 139 |
| ZnO | 1.54 | 1.56 | 1.55 | 1.54 | 1.56 | 1.56 | 1.51 | 1.5 | 1.49 |
| $ZrO_2$ | 1.42 | 1.42 | 1.42 | 1.41 | 1.42 | 1.41 | 1.39 | 1.39 | 1.38 |
| $Fe_2O_3/V_2O_5$ | 5.529 | 6.267 | 6.571 | 4.789 | 4.5 | 3.944 | 6.357 | 6.771 | 6.439 |
| Y(D65, 2°) [%] | 4.125 | 3.307 | 5.347 | 2.6 | 3.1 | 2.8 | 4.1 | 5.2 | 4.416 |
| τ @ 470 [%] | 1.8 | 1.3 | 2.5 | 0.94 | 1.22 | 1.12 | 1.67 | 2.3 | 1.793 |
| τ @ 465 [%] | 1.8 | 1.3 | 2.5 | 0.95 | 1.23 | 1.13 | 1.670 | 2.3 | 1.78 |
| τ @ 630 [%] | 10.17 | 8.64 | 12.4 | 7.19 | 8.16 | 7.6 | 10.2 | 12.4 | 10.8 |
| Difference Y(D65, 2°) − τ @ 465 [%] | 2.325 | 2.0068 | 2.8471 | 1.65 | 1.87 | 1.67 | 2.43 | 2.9 | 2.6369 |

| Wt % | A10 | A11 | C1 | C2 | C3 | C4 | C5 | C6 | C7 | C8 |
|---|---|---|---|---|---|---|---|---|---|---|
| $Al_2O_3$ | 20.61 | 20.9 | 20.2 | 20.3 | 19.3 | 19.3 | 20.9 | 20.3 | 20.3 | 20.9 |
| BaO | 2.31 | 2.03 | 2.41 | 2.36 | 0.8 | 0.8 | 2.3 | 2.6 | 2.6 | 2.23 |
| CaO | 0.14 | 0.41 | 0.36 | 0.44 | | | 0.42 | 0.5 | 0.5 | 0.43 |
| CoO | — | — | 0.027 | | | | | | | |
| $Cr_2O_3$ | — | — | | 0.032 | | | | — | — | |
| F | — | — | | | | 0.14 | | | | |
| $Fe_2O_3$(ppm) | 882 | 830 | 900 | 1400 | 2000 | 2000 | 2000 | 850 | 850 | 900 |
| $HfO_2$ | 0.025 | 0.026 | 0.025 | 0.024 | | | | | | |

TABLE 1-continued

| | | | | | | | | | | |
|---|---|---|---|---|---|---|---|---|---|---|
| K$_2$O | 0.27 | 0.24 | 0.21 | 0.21 | | | | 0.2 | 0.2 | 0.27 |
| Li$_2$O | 3.79 | 3.81 | 3.830 | 3.85 | 3.5 | 3.5 | 3.71 | 3.8 | 3.8 | 3.82 |
| MgO | 0.3 | 0.3 | 0.19 | 0.35 | 1.1 | 1.1 | 0.37 | 0.4 | 0.4 | 0.29 |
| MnO$_2$ | 0.018 | 0.019 | 0.022 | 0.023 | | | 0.25 | | | 0.025 |
| MoO$_3$ | — | — | <0.005 | <0.005 | | | | — | — | |
| Na$_2$O | 0.62 | 0.6 | 0.57 | 0.61 | | | 0.59 | 0.6 | 0.6 | 0.6 |
| Nb$_2$O$_5$ | — | — | — | 0.011 | | | | | | |
| NiO | — | — | <0.001 | <0.001 | | | | | | |
| P$_2$O$_5$ | 0.060 | — | 0.11 | 0.086 | | | | | | |
| Sb$_2$O$_3$ | — | — | <0.01 | <0.01 | | | | | | |
| SiO$_2$ | 65.15 | 65.2 | 65.8 | 65.4 | 68.86 | 68.86 | 65.14 | 65.5 | 65.5 | 65 |
| SnO$_2$ | 0.27 | 0.26 | 0.3 | 0.32 | 0.2 | 0.2 | 0.24 | 0.29 | 0.29 | 0.25 |
| SrO | 0.029 | 0.037 | 0.003 | 0.004 | | | | | | 0.021 |
| TiO$_2$ | 3.1 | 2.96 | 3.02 | 2.96 | 3.1 | 2.7 | 3.1 | 2.9 | 2.9 | 3.13 |
| V$_2$O$_5$ (ppm) | 138 | 190 | 200 | 400 | 400 | 400 | 260 | 300 | 250 | 230 |
| ZnO | 1.5 | 1.53 | 1.41 | 1.45 | 1.6 | 1.6 | 1.5 | 1.5 | 1.5 | 1.53 |
| ZrO$_2$ | 1.39 | 1.48 | 1.39 | 1.35 | 1.8 | 1.8 | 1.34 | 1.3 | 1.3 | 1.4 |
| Fe$_2$O$_3$/V$_2$O$_5$ | 6.391 | 4.368 | 4.5 | 3.5 | 5 | 5 | 7.692 | 2.833 | 3.4 | 3.913 |
| Y(D65, 2°) [%] | 4.574 | 4.2 | 3.5 | 1.3 | 15 | 42.5 | 26.7 | 4.5 | 6.0 | 2.2 |
| τ @ 470 [%] | 1.877 | 1.3 | 1.9 | 0.03 | 3 | 17.7 | 11.2 | | | 0.67 |
| τ @ 465 [%] | 1.854 | 1.3 | 2 | 0.023 | 2.7 | 16.7 | 11.8 | 1.1 | 1.6 | 0.67 |
| τ @ 630 [%] | | 11.25 | 10.75 | 4.6 | 32.36 | 63.3 | 43.76 | n.d. | n.d. | 6.62 |
| Difference Y(D65, 2°) − τ @ 465 [%] | 2.7204 | 2.9 | 1.5 | 1.277 | 12.3 | 25.8 | 14.9 | 3.4 | 4.4 | 1.53 | n.d. = no data

Examples C1 to C8 in Table 1 are comparative glass-ceramics outside of the invention.

Though C1 does have a difference (Y−τ$_{(at\ 465\ nm)}$) of 3%, the transmission characteristics are nevertheless realized through addition of CoO.

C2 likewise has a difference (Y−τ$_{(at\ 465\ nm)}$) of 3%, but the transmission values in the visible range are so low that, except for red displays, no further colours are visible. This is due to the addition of Cr$_2$O$_3$, which significantly reduces the transmission in the visible range.

Examples C3 to C5 all have a difference (Y−τ$_{(at\ 465\ nm)}$) of >3%, partly due to regions with very high transmission values, which are attributable to so-called iron overcolouring.

C6 and C7 do exhibit a light transmission Y(D65, 2°) of 2.5-10% and a spectral transmission τ$_{(at\ 465\ nm)}$>1.0%. However, their difference (Y(D65, 2°)−τ$_{(at\ 465\ nm)}$) is also >3%.

C8, while it does exhibit a difference (Y(D65, 2°) −τ$_{(at\ 465\ nm)}$)<3%, nevertheless exhibits low light transmission Y(D65, 2°) of 2.2% and low spectral transmission τ$_{(at\ 465\ nm)}$ of 0.67%.

Working Examples A1 to A11 illustrate the fact that the glass-ceramics of the invention combine the transmission properties of light transmission Y(D65, 2°) of 2.5-10%, spectral transmission τ$_{(at\ 465\ nm)}$>1.0% and a difference (Y(D65, 2°)−τ$_{(at\ 465\ nm)}$) of ≤3% and therefore make it possible on the one hand for there to be effective visibility of the underside-mounted displays with on the other hand reduced sight into the hob interior and also a colour transmissibility which is such that not only red but also colours such as green are transmitted and the colour and lightness conveyed are very neutral, in other words unfalsified, meaning conveyance of light that is unchanged or virtually unchanged despite passage through the glass-ceramic plate. The working examples, as preferred embodiments, also exhibit advantageously high transmission in the red spectral range, as shown by a spectral transmission τ at 630 nm of 10.9%±3.8%.

The starting glasses of the glass-ceramics of the invention possess low melting and forming temperatures and can be produced from inexpensive mix raw materials. They exhibit high devitrification resistance. They can be converted into glass-ceramics within short ceramization times.

The glass-ceramics of the invention therefore have economic and eco-friendly manufacturing properties, the latter the result of omission of the environmentally harmful raw materials arsenic oxide, antimony oxide, cobalt oxide and chromium oxide. The glass-ceramics of the invention satisfy the requirements of the various applications. Thus they have chemical resistance, high mechanical strength, the desired transmission properties, little to no light scattering, high temperature robustness and a high long-term stability in respect of changes in their properties (such, for example, as thermal expansion, transmission, development of stresses).

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. Coloured, transparent, lithium aluminium silicate glass-ceramic, characterized by
    an As$_2$O$_3$ and/or Sb$_2$O$_3$ content of in total 0 to <1000 ppm,
    a V$_2$O$_5$ content of 100 ppm to 200 ppm,
    an Fe$_2$O$_3$ content of 700 ppm to 1000 ppm, and
    a ratio of Fe$_2$O$_3$/V$_2$O$_5$ (both in wt %) of 3-9,
    wherein the lithium aluminium silicate glass-ceramic includes alkali earth metal oxides and is free from CoO, NiO and Cr$_2$O$_3$, and
    wherein the lithium aluminosilicate glass-ceramic has the following transmission qualities when the lithium aluminosilicate glass-ceramic is measured at a 4 mm thickness after polishing with a standard illuminant D65 and an observer angle of 2°:
    Y(D65, 2°) 2.5–10%,
    τ (at 465 nm)>1.0%, and
    a difference (Y(D65, 2°)−τ (at 465 nm)) of ≤3%.

2. Lithium aluminium silicate glass-ceramic according to claim 1, characterized by
    Y(D65, 2°)>2.5–10%,
    τ (at 465 nm)>1.2%, and
    a difference (Y(D65, 2°)−τ (at 465 nm)) of <3%.

3. Lithium aluminium silicate glass-ceramic according to claim 1, characterized by τ (630 nm) of 10.9%±3.8%.

4. Lithium aluminium silicate glass-ceramic according to claim 1, characterized in that it comprises the following components in wt % on an oxide basis:

| | |
|---|---|
| $Li_2O$ | 3.0-4.2 |
| $Na_2O + K_2O$ | 0.2-1.5 |
| MgO | 0-1.5 |
| CaO + SrO | 0-4 |
| BaO | 0-3 |
| ZnO | 0-2.2 |
| $Al_2O_3$ | 19-23 |
| $SiO_2$ | 60-69 |
| $TiO_2$ | 2.5-4 |
| $ZrO_2$ | 0.5-2 |
| $SnO_2$ | 0.05-<0.6 |
| $P_2O_5$ | 0-3 |
| $B_2O_3$ | 0-2 | and also, optionally, chemical refining agents and refining additives in a total amount of up to 2.0 wt %.

5. Lithium aluminium silicate glass-ceramic according to claim 4, characterized in that it comprises the following components in wt % on an oxide basis:

| | |
|---|---|
| $Li_2O$ | 3.2-4.0 |
| $Na_2O + K_2O$ | 0.4-1.2 |
| MgO | 0.1-1.3 |
| CaO + SrO | 0.2-1 |
| BaO | 1.5-2.8 |
| ZnO | 1-2.2 |
| $Al_2O_3$ | 20-22 |
| $SiO_2$ | 62-67 |
| $TiO_2$ | 2.8-3.5 |
| $ZrO_2$ | 1-1.8 |
| $SnO_2$ | 0.1-0.4 |
| $P_2O_5$ | 0-0.1 |
| $B_2O_3$ | 0-1 | and also, optionally, refining additives in a total amount of up to 1.0 wt %.

6. Lithium aluminium silicate glass-ceramic according to claim 1, characterized in that the $SnO_2$ content is 0.05-0.4 wt %.

7. Lithium aluminium silicate glass-ceramic according to claim 1, characterized by a ratio of $Fe_2O_3/V_2O_5$ (both in wt %) of 5-7.

8. Lithium aluminium silicate glass-ceramic according to claim 1, characterized in that it comprises high-quartz mixed crystals as main crystal phase.

9. Glass-ceramic plate comprising a glass-ceramic according to claim 1, wherein the glass-ceramic plate has a thickness of 2 mm to 20 mm.

10. A cooking surface, a chimney sight panel/chimney oven lining or facing, a covering for lighting, a safety glass, a support plate or oven lining in the ceramics, solar or pharmaceutical industry or in medical technology, for production processes under high-purity conditions, an oven lining in which chemical or physical coating procedures are conducted, a chemically resistant laboratory equipment, a glass-ceramic article for high-temperature or extreme low-temperature applications, a furnace window for combustion furnaces, a heat shield for shielding hot environments, a covering for reflectors, floodlights, projectors or photocopiers for applications involving thermomechanical exposure, a cooking or a frying surface, a white ware, a heating element covering, a wafer substrate, an article with UV protection, an architectural facing plate or a construction constituent of an electronic appliance, comprising the lithium aluminium silicate glass-ceramic according to claim 1.

11. The cooking surface according to claim 10, where the cooking surface has an underside coating with or without cut-outs, or the cooking surface has a diffuser layer which uniformly distributes light emerging from an underside of the cooking surface towards a viewer, or the cooking surface has a colour compensation filter applied in adhered or printed or coated form, or the cooking surface has an opaque or transparent capacity sensor structure applied in bonded, printed or pressed-on form for regulating and controlling operation, or the cooking surface has one or more holes for control buttons, gas burners, fume removal systems and/or other functional modules, or the cooking surface has a flat facet at one or more edges, or the cooking surface has a transmission, defined via the Y(D65, 2°) value, which is increased/modified locally in a display region and/or a hot region.

12. Lithium aluminium silicate glass-ceramic according to claim 1, characterized by τ (630 nm) of 10.9%±2.5%.

13. Lithium aluminium silicate glass-ceramic according to claim 1, characterized in that the alkali earth metal oxide content is at most 4 wt %.

14. Lithium aluminium silicate glass-ceramic according to claim 1, characterized in that it comprises a total amount of $Na_2O$ and $K_{20}$ of at least 0.4 wt %.

* * * * *